H. COUSIN.
ELECTROMAGNETIC DEVICE FOR NOTIFYING AND RECORDING THE PASSING OF SIGNALS AT DANGER.
APPLICATION FILED JAN. 24, 1911.

1,139,347.

Patented May 11, 1915.
7 SHEETS—SHEET 1.

Witnesses

Inventor

H. COUSIN.
ELECTROMAGNETIC DEVICE FOR NOTIFYING AND RECORDING THE PASSING OF SIGNALS AT DANGER.
APPLICATION FILED JAN. 24, 1911.

1,139,347.

Patented May 11, 1915.
7 SHEETS—SHEET 7.

UNITED STATES PATENT OFFICE.

HENRI COUSIN, OF PARIS, FRANCE.

ELECTROMAGNETIC DEVICE FOR NOTIFYING AND RECORDING THE PASSING OF SIGNALS AT DANGER.

1,139,347.  Specification of Letters Patent.  Patented May 11, 1915.

Application filed January 24, 1911. Serial No. 604,684.

*To all whom it may concern:*

Be it known that I, HENRI COUSIN, a citizen of the Republic of France, residing in Paris, in the Republic of France, have invented certain new and useful Improvements in and Relating to Electromagnetic Devices for Notifying and Recording the Passing of Signals at Danger, of which the following is a specification.

For operating apparatus arranged on locomotives for notifying and recording the passing of signals at danger there are generally provided on railway lines pedals which being raised at the moment when the corresponding signal is set to danger, come in contact with dependent arms on the locomotive. The movement of these dependent arms is then transmitted to warning and controlling apparatus.

This invention relates to a warning and registering system using an electro-mechanical whistle or warning device actuated by pedals arranged on the track in the manner hereinbefore mentioned.

In the accompanying drawings to which reference will be made in the following specification.

In all these figures the same reference letters indicate the same parts.

The working of the whistle or warning arrangement may be summarized in the following way:—When the locomotive reaches and passes a signal at danger, the action of the pedal elevated on the track acts on a dependent arm which causes the warning apparatus to be set in operation, such as a siren or a whistle, at the same time as the movement of the dependent arm is automatically recorded the same instant as it is produced.

The system is combined in such a way that if an obstacle be found on the track in the path of the dependent arm, the action of this latter is neutralized. Further the driver, by operating a simple hand lever, can cause to be recorded the moment at which he noticed that the signal was at danger, which moment must precede his passing this signal, and can restore to the position of repose all the parts of the system.

Figure 1:
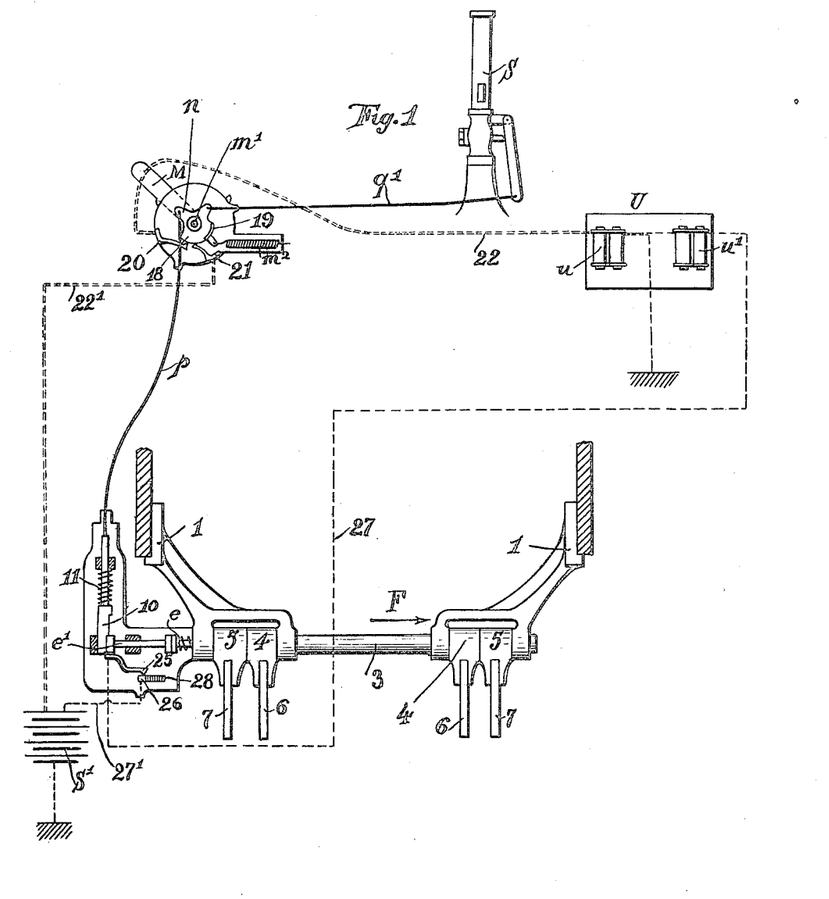
—Figure 1 is a diagrammatic view of the whole of the whistle or warning device mechanism.

Now referring to Fig. 1 of the drawings, it will be seen that the whistle arrangement comprises a transverse shaft 3 mounted in supports 1 fixed to the longitudinal frames or girders of the locomotive, for instance.

At each end of the said shaft 3, two sets or groups of two juxtaposed dependent arms 6 and 7 are arranged. If the whole arrangement represented be considered, assuming the smoke stack or funnel of the locomotive is normally in front, the set of dependent arms on the left hand side serves for the locomotive traveling with the funnel in front and the set of dependent arms on the right hand side serves in the case of running with the smoke stack to the rear.

In these two groups the inner dependent arm 6 is alone operative and can, when pushed in a suitable direction, cause the warning and recording arrangement to operate by pushing in a known manner the part 4 which carries it.

If the two dependent arms 6 and 7 of the same group are pushed simultaneously in a direction which must involve the working of the system, the action of the second external dependent arm 7 which involves its support piece 5, at the same time as the juxtaposed dependent arm 6 which involves its part 4, has the effect of destroying or neutralizing the action of the active dependent arm 6. The dependent arms 6 and 7 are therefore respectively pivoted on a piece in the form of a socket 4 or 5 surrounding the shaft 3 and which they must turn about this shaft when they are pushed in a given direction, while when pushed in the opposite direction they have no action on their supporting sockets.

Figures 2, 3:
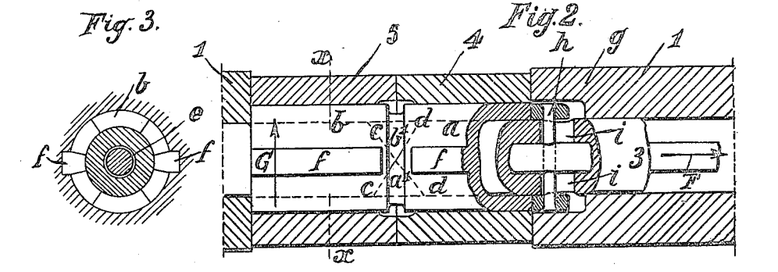
Fig. 2 is a longitudinal section of the shaft carrying the dependent arms intended to be operated by pedals on the track in order to set the arrangement in action.
Fig. 3 is a corresponding transverse section made on the line $x$—$x$ of Fig. 2.

Between each of the sockets 4 and 5 and the shaft 3, Figs. 2 and 3, there are located sleeves $a$ and $b$. The two sleeves $a$ and $b$ rest one upon the other by the intermediary of collars $a'$ $b'$ each occupying half the interval which separates the said sleeves. These collars are sectioned in inclined planes $c$ and $d$ which when in repose form juxtaposed cams. It is by the intermediary of the sleeves $a$ which correspond to the active dependent arms 6 that the movement of these latter is transmitted to a rod $e$ located in the shaft 3 with a view of causing the action of the warning device and the recording device. For this object the sleeves $a$ and $b$ are firmly connected with their sockets 4 or 5 so as to share in the rotary movement of these latter. They are provided for this purpose with projections $f$ which engage in corresponding recesses formed in the sockets 4 and 5. If, however, the sleeves necessarily revolve with their sockets, nothing prevents them being displaced by sliding along the shaft 3.

In order to cause the system to operate, the central rod $e$ must be moved in the direction indicated by the arrow F, Figs. 1 and 2.

As has been hereinbefore stated, the movement of the hanging or dependent arm 6 of the left hand group, Fig. 1, must operate the said rod $e$ when the locomotive is traveling with the smoke stack or funnel in front. On the other hand the pendent arm 6 of the right hand group comes into action when the engine is traveling with the smoke stack at the rear or backing.

The following is what takes place as regards the left hand group when the dependent arm 6 encounters a pedal on the track. This dependent arm draws its socket 4, which turns about the axis of the shaft 3, as well as its sleeve $a$ in the direction indicated by the arrow G, Fig. 2. The sleeve $a$, owing to the cams at $c$ $d$ tends to force the sleeve $b$ toward the left, but as this latter is at this moment fixed and bears against the support 1, it follows that when turning, the sleeve $a$ is displaced toward the right, thus pushing a ring $g$ firmly attached to a guide rod $h$ which passes through the shaft 3 and the central axis $e$.

Figure 4:
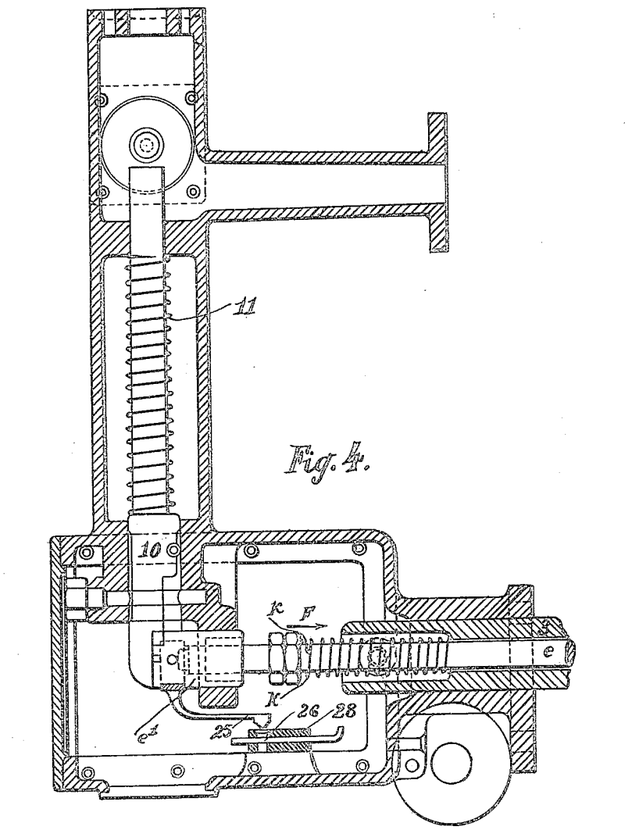
Figs. 4 and 5 are respectively a vertical section and a horizontal plan view of one of the parts of the mechanism which acts when the dependent arms are displaced in order to give the warning and record the passing of a signal at danger.
Figure 5:
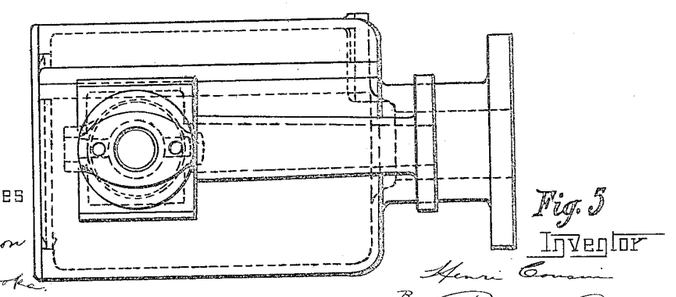

The displacement of the rod $h$ has no effect on the shaft 3, which has guide slots $i$ of sufficient length to allow of this movement, but this rod draws to the right the central axis $e$, the end $e'$ of which, Figs. 1 and 4, liberates a sort of piston 10, which in repose bears on this end under the action of a spring 11, suitably arranged and which constantly tends to push it downward.

Figure 6:
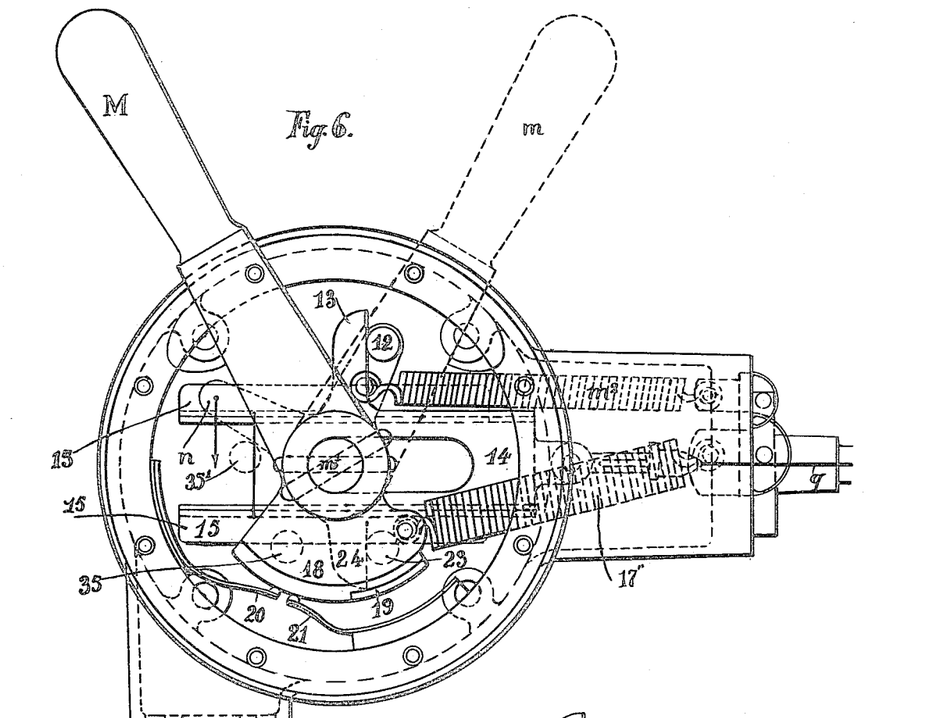
Figs. 6 and 7 are respectively a front and side view of an apparatus having a handle which is under the control of the driver for the purpose of checking his vigilance.
Figure 7:
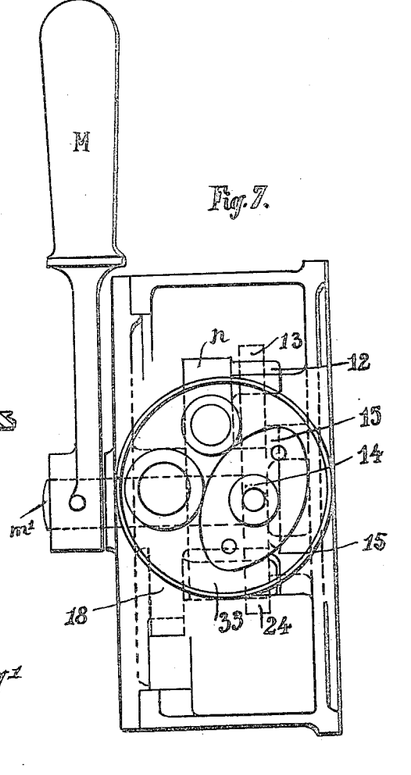
Figure 8:
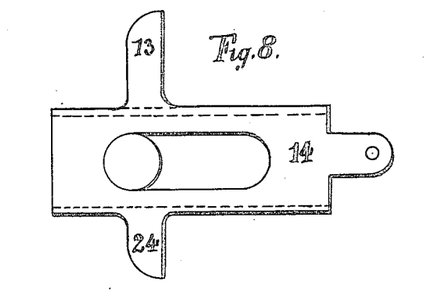
Fig. 8 is a separate view of one of the parts of this apparatus.

The piston 10 which is connected with the end of a flexible transmission $p$ of any type, when it is acted on by the spring 11, draws by the intermediary of the said flexible transmission one of the arms of a bell crank lever $n$ pivoted at $m'$, Figs. 1, 6 and 7, and which a spring $m^2$ tends to bring into a position of repose without, however, the force of this spring being able to overcome that of the spring 11. The other arm of this lever $n$ which is provided with a nipple 12, then acts by the intermediary of this latter on a finger 13 carried by a part 14 represented in detail, Fig. 8, and which is adapted to be displaced between the guides 15. The movement thus communicated to the part 14 is transmitted by a flexible transmission $q'$ to the member which causes the operation of a whistle S having a special note, as shown in Fig. 1 of the drawings.

It is evident from the foregoing description that the whistle S is controlled automatically and operates when one of the dependent arms 6, according to the direction in which the engine is traveling, is displaced by a pedal on the track, raised at the moment when the corresponding signal is placed to danger.

After passing the pedal on the track, the movable parts arranged on the shaft 3 resume their original position under the action of suitable springs, more particularly the rod $e$ $e'$ under the action of the spring $k$. It must also be observed that the spring intended to bring back to the position of repose the operating lever of the special whistle S and which adds its action by the intermediary of the transmission $q'$ and the part 14 to that exerted by the spring $m^2$ before mentioned, cannot yet overcome the action of the spring 11, and under these conditions the system must be put back to the position of repose by an ultimate operation as will be hereinafter explained.

The inner depending arm 6 operates the arrangement described when it rocks by the action of a pedal elevated on the track by the setting of the signal, and this pedal is of such dimensions that it only actuates the arm 6 aforesaid. It may, however, happen that some obstacle, such as a stone, piece of track, sleeper, or the like, accidentally encounters the depending arm 6 and in order that the shock of this shall not cause the system to operate erroneously, the arm 7 is provided by the side of the arm 6 and sufficiently close thereto that the aforesaid unauthorized movement of the arm 6 will be imparted to the arm 7, under which conditions both arms will be caused to rock simultaneously and the action of the arm 7 will be to neutralize that of the arm 6, thus preventing operation of the signal mechanism. The likelihood of the erroneous or unauthorized operation of the signal is reduced by the association and coöperation of the arms 6 and 7, for it is unlikely that any accidental shock or vibration would be imparted to the arm 6 alone. In order that such a system may give every satisfaction in practice it must be possible that, in addition to the automatic setting in action of the warning apparatus 3, as hereinbefore specified:—1. The driver, if he has noticed that the signal is at the stop or danger position shall be able to immediately record this notice; and 2. The setting in action of the active dependent arms 6 which involve the action of the warning apparatus S, shall also be recorded at the moment at which it is produced. This improved system complies with these conditions owing to an electromechanical combination.

Figures 9, 14:
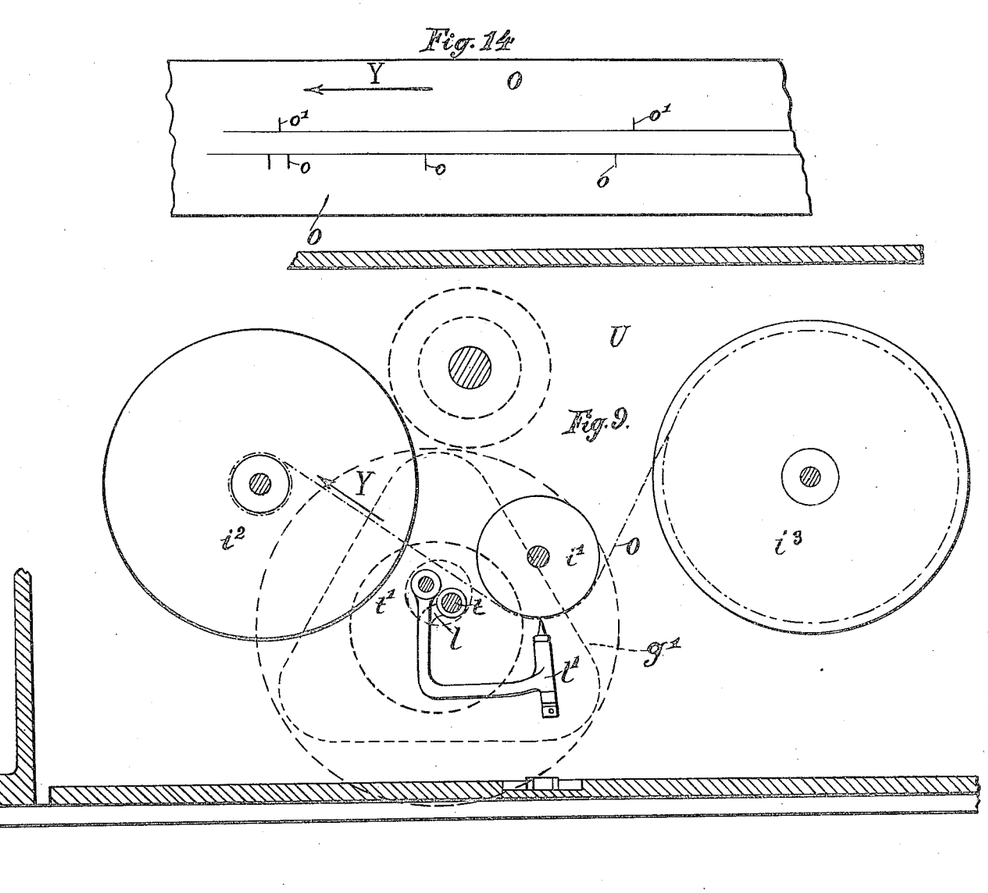
Fig. 9 is a horizontal projection of the recording or registering device.
Fig. 14 represents a part of the paper band which is displaced beneath the recording points.
Figure 10:
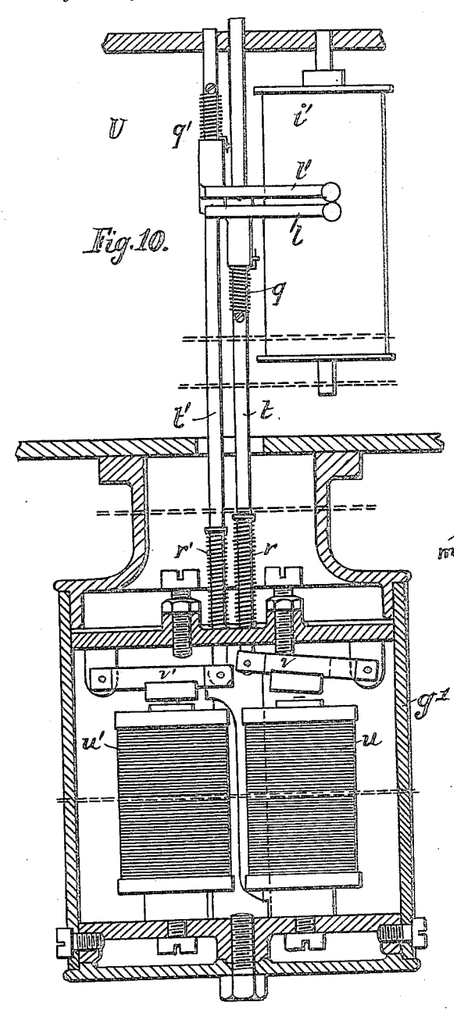
Figs. 10 and 11 are respectively a front and side view of the mechanism controlling the recording points.
Figure 11:
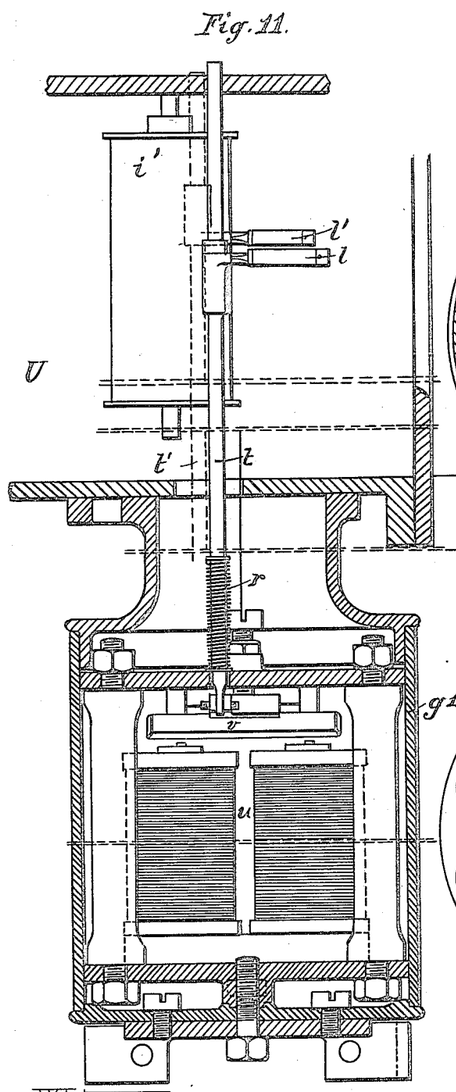
Figure 12:
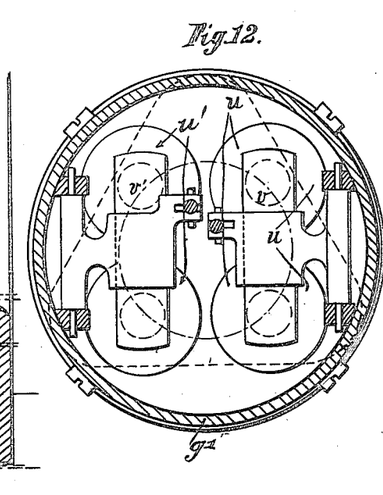
Figs. 12 and 13 are respectively a view from above and a view from beneath of this mechanism.
Figure 13:
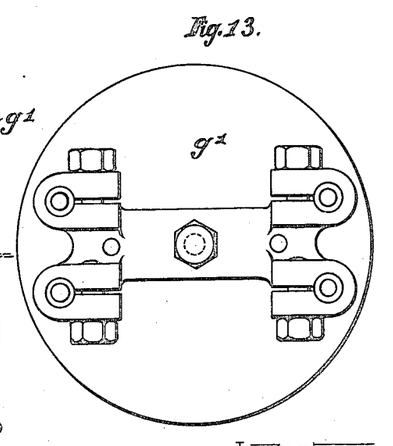
Figures 15, 16:
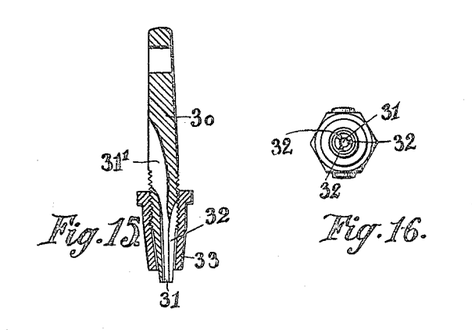

For this object the system comprises a recording apparatus U, shown in Fig. 9, in which a sheet of paper O wound on a drum $i^3$ passes over a cylinder $i'$ opposite two recording styles $l\ l'$, in order then to be wound on a receiving drum $i^2$.

The paper band O passes before the styles $l\ l'$ in the direction indicated by the arrow Y at a speed proportionate to that of the locomotive. It has not been thought necessary to reproduce in the drawings the mechanism for moving the paper band because such mechanism is well known in practice.

The recording styles, which under ordinary conditions trace parallel lines on the sheet of paper O may be respectively controlled by electromagnets $u$, $u'$, these latter being located in a box $g'$ fixed on the bottom of the recording device U, Figs. 10 to 13.

Rods $t\ t'$ suitably guided and each of which carries one of the recording styles $l\ l'$ are hinged or pivoted on their respective armatures $v\ v'$. The rods $t\ t'$ are each subjected to the action of springs $r$ or $r'$ acting so as to remove the said armatures $v\ v'$ from the pole pieces of the electromagnets $u\ u'$ when these latter are not excited.

In addition the styles $l\ l'$ are loosely mounted on their support rods $t$ or $t'$ and bear constantly on the sheet of paper O of the recording mechanism by means of springs $q$ or $q'$.

The electromagnets $u$ and $u'$ the coils of which are connected to earth, are each inserted in an electric circuit, one of which circuits which corresponds to the recording of the recognition of the signal by the driver, is normally open and serves the electromagnet $u$, while the other, which corresponds to the recording of the operation of a dependent arm 6 by a pedal on the track, is normally closed and serves the electromagnet $u'$.

1. If the driver notices a disk (or signal) at danger, he can immediately record this recognition. In order to do this, the driver has at his disposal a hand lever M, Figs. 1, 6 and 7, which it suffices for him to put to the position $m$ in order to obtain the desired result. In fact the handle M which is mounted in an independent manner on the same axis $m'$ as the lever $n$ and which a spring 17 tends to maintain in the position of repose M, is attached to a sector 18 provided with a contact plate 19 which is perfectly insulated electrically and which in repose is inoperative but which connects two insulated contacts 20 and 21 when the handle is pushed by the driver to $m$. The contact 21 is connected by a wire 22' to a source of electricity S', the negative pole of which is earthed, and the contact 20 is connected by a wire 22 with the coil of the electromagnet $u$. In consequence of the bridging of the contacts 20 and 21 the circuit of the electromagnet $u$ is then closed. This magnet being excited attracts its armature $v$ which involves its style $l$ and causes it to trace on the paper band O, shown separately in Fig. 14, a mark $o$ at right angles to the line normally traced by this style $l$ when in repose. The sector 18 is also provided with a nipple 23 which when the handle M is moved toward $m$ acts on a finger 24 carried by the sliding piece 14, of which mention has previously been made, so as to cause the warning apparatus S to operate. When the handle is released it returns to its position of repose under the action of the spring 17, as also do the various parts of the circuit 22.

2. The setting in action of the active hanging arms 6 by a pedal on the track is recorded the moment it is produced. For this object the part $e'$, which is displaced in the manner stated, when a dependent arm 6 is engaged by a pedal on the track, carries an insulated contact 25 connected by a wire 27 to the coil of the electromagnet $u'$ and which when in repose bears on an electrically insulated part 26 and connected by a wire 27' to a source of electricity S' so as to close the electric circuit in which the electromagnet $u'$ is arranged. When the part $e'$ is pushed to the right, its contact 25 quits the part 26 in order to rest on the insulated support 28 of the latter and under these conditions it is evident that the circuit of the said electromagnet $u'$ is opened. The armature $v'$ of this electromagnet which was attracted on the passage of the current, is left to itself and under the action of a spring r' it causes the displacement of the style l' which then traces a line o' on the band O of the recording device U at right angles to the one which the style traces in its normal position.

As soon as the pedal on the track is passed, the contact 25, under the action of the spring k, moves back on to the surface 26 and again closes the circuit 27—27', the corresponding electromagnet u' attracts its armature and is in a position for a fresh operation.

It may here be pointed out that the whole of the warning or whistling arrangement after working, cannot occupy an absolute position of repose and consequently be ready for operating afresh until the piston 10 is raised and engaged on the stop e'. This engagement is produced by the driver pushing the handle M to m, the sector 18 having for this purpose a nipple 35 which engages with the bell crank lever n with a view of drawing upward the transmission p and consequently the said piston 10 which compresses its spring 11; at this moment the nipple 35 is at 35'. Of course this movement of the handle M necessarily causes a mark o to be made as already explained. It is easy to understand the interest which the presence of the marks o and o' on the band O presents.

By examining this band O, Fig. 14, and following the line traced by the styles l and l' and taking into account the displacement of this band, it may be seen that at a certain mile post the driver saw a signal at danger mark o; in case there is no sign o' corresponding to this mark o the driver stopped his engine before encountering the pedal of the signal at danger, or the signal was pulled off between the point at which it was seen and the moment at which it was passed. If the mark o' appears on the band O after the mark o, the engine has passed the signal at danger, although this latter has been seen by the driver. When the band has after a mark o and a mark o' a fresh mark o, it means that the driver has put the arrangement back to a position of repose after passing the pedal. Finally if the mark o' appears alone or appears in front of the corresponding mark o, the signal at danger has been passed and has not been recognized by the driver or has been recognized too late.

I declare that what I claim is:—

1. In a railway safety appliance, the combination of a vehicle movable along a line of way, a signal on the vehicle, obstacle operable means on the vehicle for operating said signal, recording mechanism to register the operation of said signal, and manual means adapted to make a record on said recording mechanism at any desired moment.

2. In a railway safety appliance, the combination of a vehicle movable along a line of way, a signal on the vehicle, automatic means on the vehicle for operating said signal, means external of said vehicle to control said automatic means, recording mechanism to register the operation of said signal, and manual means adapted to make a record on said recording mechanism at any desired moment.

3. In a railway safety appliance, the combination of a vehicle movable along a line of way, a signal on the vehicle, obstacle operable means on the vehicle for operating said signal, recording mechanism adapted to move constantly in a predetermined path from which it is deflected on the operation of said signal, and manual means adapted to make a record on said recording mechanism at any desired moment.

4. In a railway safety appliance, the combination of a vehicle movable along a line of way, a signal on the vehicle, obstacle operable means on the vehicle for operating said signal, recording mechanism adapted to furnish a normal reading and to furnish an abnormal reading to register the operation of said signal, and manual means adapted to make a record on said recording mechanism at any desired moment.

5. In a railway safety appliance, the combination of a vehicle movable along a line of way, a signal on the vehicle, obstacle operable means on the vehicle for operating said signal, recording mechanism adapted to record the time at which the operation of said signal was effected, and manual means adapted to make a record on said recording mechanism at any desired moment.

6. In a railway safety appliance, the combination of a vehicle movable along a line of way, a signal on the vehicle, obstacle operable means on the vehicle for operating said signal, recording mechanism to register the operation of said signal, and manual means adapted to make a record on said recording mechanism at any desired moment, said recording mechanism being so arranged as to furnish a record of the sequence of operation by said manual means and said obstacle operable means.

7. In a railway safety appliance, the combination of a vehicle movable along a line of way, a signal on the vehicle, obstacle operable means on the vehicle for operating said signal, recording mechanism to register the operation of said signal, and manual means adapted to make a record on said recording mechanism and to shift said signal from the inoperative to the operative position.

8. In a railway safety appliance, the combination of a vehicle movable along a line of way, a signal on the vehicle, obstacle operable means on the vehicle for operating said signal, recording mechanism to register the operation of said signal, and manual means adapted to make a record on said recording mechanism at any desired moment and to operate said signal.

9. In a railway safety appliance, the combination of a vehicle movable along a line of way, a signal on the vehicle, obstacle operable means on the vehicle for operating said signal, recording mechanism to register the operation of said signal, manual means adapted to make a record on said recording mechanism at any desired moment and electric connections between said recording mechanism and said manual and obstacle operable means.

10. In a railway safety appliance, the combination of a vehicle movable along a line of way, a signal on the vehicle, obstacle operable means on the vehicle for operating said signal, recording mechanism, electric connections between said obstacle operable means and said recording mechanism adapted to register the operation of said signal by a normally closed circuit, and manual means adapted to make a record on said recording mechanism at any desired moment.

11. In a railway safety appliance, the combination of a vehicle movable along a line of way, a signal on the vehicle, obstacle operable means on the vehicle for operating said signal, recording mechanism, electric connections between said recording mechanism and said obstacle operable means constituting a normally closed circuit adapted to register the operation of said signal, manual means adapted to make a record on said recording mechanism at any desired moment, and a normally open electric circuit connecting said manual means and said recording mechanism.

12. In a railway safety appliance, the combination of a vehicle movable along a line of way, a signal on the vehicle, obstacle operable means on the vehicle for operating said signal, recording mechanism to register the operation of said signal, manual means adapted to make a record on said recording mechanism at any desired moment, and means to restore said obstacle operable means to its normal position after the operation of the signal thereby.

13. In a railway safety appliance, the combination of a vehicle movable along a line of way, a signal on the vehicle, obstacle operable means on the vehicle for operating said signal, recording mechanism to register the operation of said signal, manual means adapted to made a record on said recording mechanism at any desired moment, means to restore said obstacle operable means to its normal position after operation of the signal thereby, and means to register the operation of said restoring mechanism.

14. In a railway safety appliance, the combination of a vehicle movable along a line of way, a signal thereon, obstacle operable and manual means connected with said signal for individually operating the latter and carried by the vehicle, means normally restraining said obstacle operable means from operating the signal, means to release said obstacle operable means, a restoring mechanism to restore said obstacle operable means to its normal condition after release thereof, and a connection between said restoring means and said manual means permitting operation of the manual means to actuate the signal without affecting the operation of the obstacle operable means.

15. In a railway safety appliance, the combination of a vehicle movable along a line of way, a signal thereon, individual obstacle operable and manual means carried by the vehicle and connected with the signal in such manner that each is adapted to operate said signal, means normally restraining said obstacle operable means from operating the signal, means to release said obstacle operable means, a restoring mechanism adapted to restore said obstacle operable means to its normal condition after release thereof, a connection between said restoring means and said manual means permitting operation of the manual means to actuate the signal without affecting the operation of the obstacle operable means, and recording mechanism to record the last mentioned operation of the manual means, the operation of the restoring means, and the operation of the obstacle operable means to actuate the signal.

16. In a railway safety appliance, the combination of a vehicle movable along a line of way, a signal thereon, obstacle operable mechanism comprising a sliding member connected with said signal, means for actuating said sliding member, a lock mechanism for restraining said sliding member from movement, a device for releasing said sliding member from the locking mechanism, a manually operable device connected with the signal, means to restore said sliding member to its normal position after it has been released, a connection between said restoring means and said manual device, and a recording mechanism comprising two recording members, an electric circuit including the manual device aforesaid and one of said recording members, an electric circuit including the locking mechanism and the other of the recording members aforesaid, said circuits being so disposed that the recording members register the operation of the manual device and the obstacle operable means.

17. In a railway safety appliance, the combination of a signal, normally restrained actuating means connected to the signal, an obstacle operable member to release said actuating means and thereby cause operation of the signal, a manually controlled device for operating the signal previous to operation by the actuating means above mentioned, a member operable by the manually controlled device for restoring the signal actuating means to its normal condition, a recording device, connections between the manually controlled device and the recording device for recording the operation of the former, and means to register on the recording device the operation of the obstacle operable member.

In witness whereof, I have hereunto signed my name this 11th day of January, 1911, in the presence of two subscribing witnesses.

HENRI COUSIN.

Witnesses:
ANTONIN MONTEILHET,
H. C. COXE.

Copies of this patent may be obtained for five cents each, by addressing the "Commissioner of Patents Washington, D. C."